L. M. SEVERANCE.
Platform Scale.
No. 40,434.
2 Sheets—Sheet 1.
Patented Oct. 27, 1863.
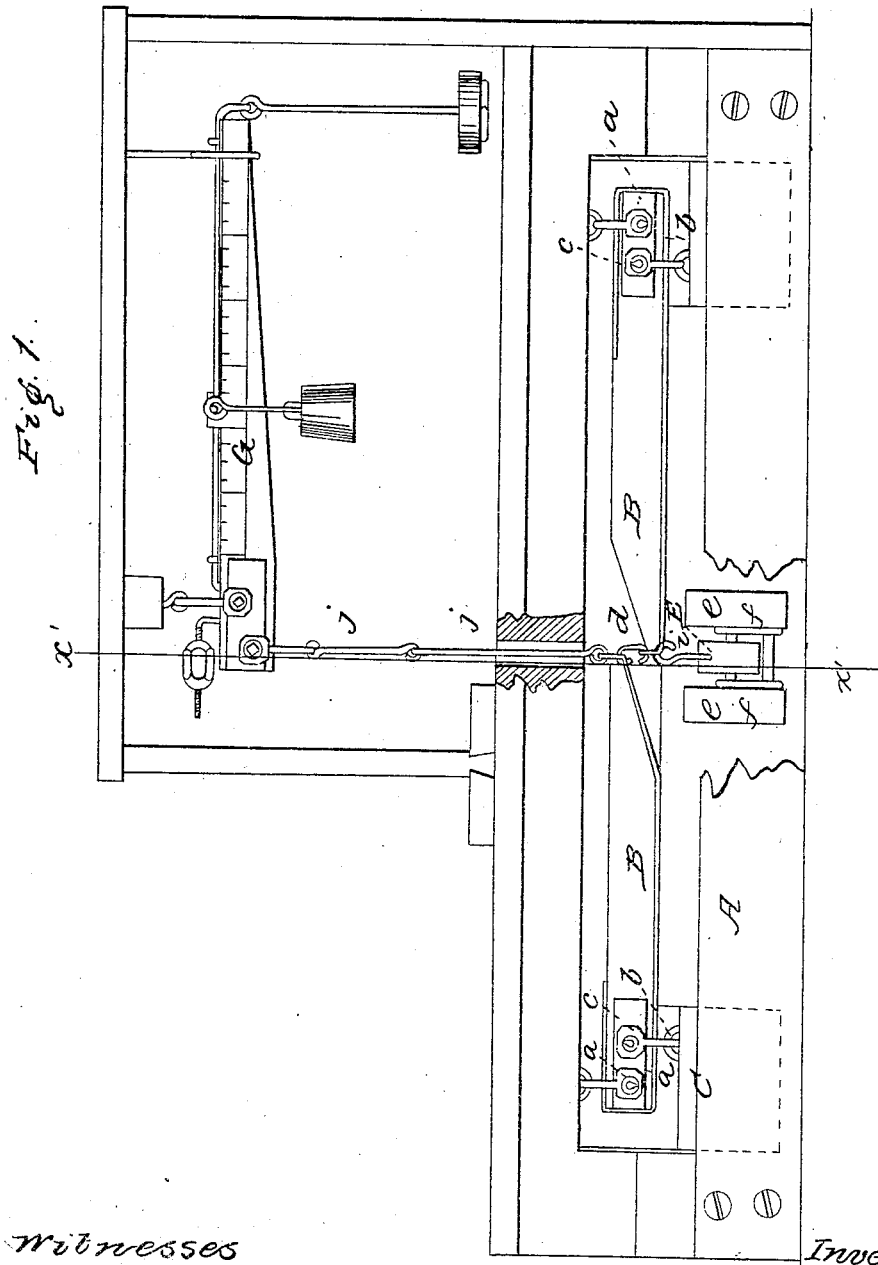

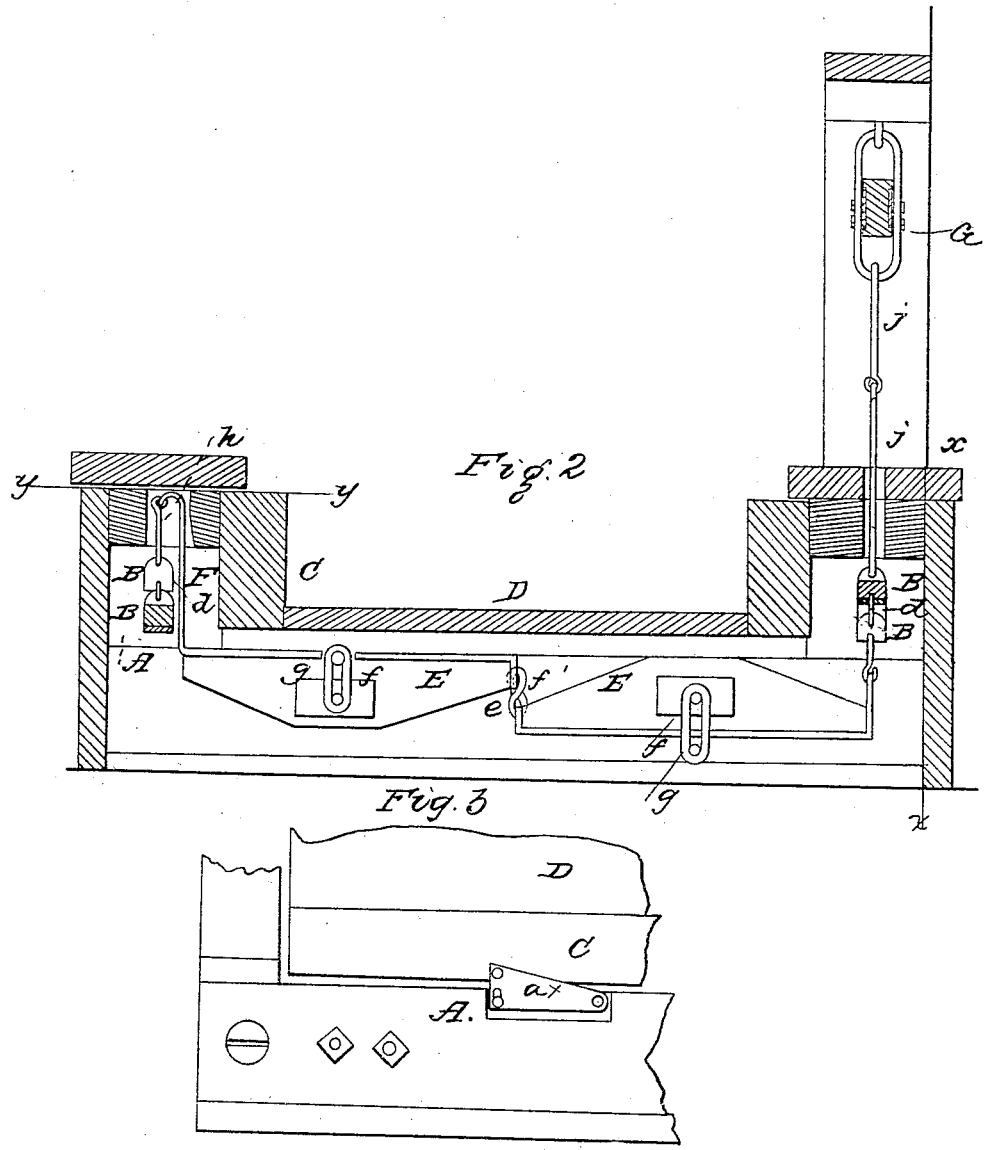

UNITED STATES PATENT OFFICE.

L. M. SEVERANCE, OF DIXON, ILLINOIS.

IMPROVEMENT IN PLATFORM-SCALES.

Specification forming part of Letters Patent No. 40,434, dated October 27, 1863.

*To all whom it may concern:*

Be it known that I, L. M. SEVERANCE, of Dixon, in the county of Lee and State of Illinois, have invented a new and useful Improvement in Platform-Scales; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a transverse vertical section of the same, taken in the line $x'\ x'$, Fig. 1; Fig. 3, a plan or top view of a portion of the same.

Similar letters of reference indicate corresponding parts in the several figures.

This invention relates to an improvement on platform-scales formerly patented by me, the Letters Patent bearing date November 11, 1862.

The invention consists in an improvement in the levers which connect the platform-levers with the scale-beam, whereby the scale is rendered far more sensitive than hitherto, and the scale-beam rendered capable of being placed at any convenient distance from the platform, so as not to be in the way of the load to be weighed, and the heavy loading of the platform hitherto required in order to render the scale sensitive and accurate entirely avoided.

To enable those skilled in the art to fully understand and construct my invention, I will proceed to describe it.

A represents a rectangular box, in which the levers and working parts of the scale are placed. At each side of the box A there are placed two levers, B B, which are suspended on knife-edges $a$, as shown in Fig. 1, and are connected by links $b$ to the ends of a frame, C, on which the platform D is secured, the links $b$ being connected to the levers B by knife-edges $c$. The levers B are connected at their inner ends by links $d$, and at the center of the box A there are two cross-bars, $e\ e$, between which two levers, E E, are fitted and work by links $f$ on pins $g$, as shown clearly in Fig. 2. The inner ends of the levers E E are connected by a link, $f'$, and the outer end of one of said levers has a bar, F, attached to it, which extends vertically upward, and is bent or curved at its upper end to admit of the inner ends of the two levers B B at one side of the box A being suspended to it by a link, $h$, as shown in Fig. 2.

The outer end of the other lever E is connected by a link, $i$, with the inner ends of the other two levers B B, as shown in Fig. 1, and these last-named levers B are connected by a rod or links, $j$, with the scale-beam G. By this arrangement the frame C and platform D may be very nicely balanced, so that the scale will weigh with great accuracy and without the necessity of loading the platform or having a heavy frame, C, as was hitherto the case. The weight of the load on the platform is transmitted by the two pairs of levers B to the levers E E, and the latter transmit the weight to the scale-beam G.

The whole arrangement is extremely simple and efficient, and does not augment the cost of construction above that of the scale as originally devised and patented.

I would remark that the frame C may have one or more guides, $a^{\times}$, attached to it and the box A to steady the frame C and platform D.

Having thus described my invention, what I claim as new, and desire to secure by Letters Patent, is—

The two levers E E, in combination with the two pairs of levers B, all arranged and connected to each other and to the scale-beam G substantially as and for the purpose herein set forth.

L. M. SEVERANCE.

Witnesses:
GEO. C. CHAPMAN,
J. P. DOUGLAS.